(12) United States Patent
Kufner et al.

(10) Patent No.: US 11,980,919 B2
(45) Date of Patent: May 14, 2024

(54) CLEANING CHEMICAL ASSEMBLY, CLEANING CHEMICAL MODULAR SYSTEM, AND COOKING APPLIANCE

(71) Applicant: RATIONAL Aktiengesellschaft, Landsberg am Lech (DE)

(72) Inventors: Christian Kufner, Landsberg am Lech (DE); Filip Lindell, Landsberg am Lech (DE); Manuel Ulmer, Landsberg am Lech (DE)

(73) Assignee: RATIONAL AKTIENGESELLSCHAFT (DE)

( * ) Notice: Subject to any disclaimer, the term of this patent is extended or adjusted under 35 U.S.C. 154(b) by 240 days.

(21) Appl. No.: 17/369,708

(22) Filed: Jul. 7, 2021

(65) Prior Publication Data

US 2022/0008962 A1 Jan. 13, 2022

(30) Foreign Application Priority Data

Jul. 7, 2020 (DE) ...................... 10 2020 117 840.9

(51) Int. Cl.
*B08B 3/08* (2006.01)
*A47J 27/04* (2006.01)
(Continued)

(52) U.S. Cl.
CPC ................ *B08B 3/08* (2013.01); *A47J 27/04* (2013.01); *A47J 27/16* (2013.01); *A47J 36/32* (2013.01);
(Continued)

(58) Field of Classification Search
None
See application file for complete search history.

(56) References Cited

U.S. PATENT DOCUMENTS

| 6,213,002 B1* | 4/2001 | Batten et al. ........... A47J 27/04 |
| | | 99/340 |
| 10,767,871 B2 | 9/2020 | Budich ................. F24C 14/005 |

(Continued)

FOREIGN PATENT DOCUMENTS

| DE | 102014202430 | 8/2015 | ............... B08B 3/08 |
| DE | 102014008834 | 12/2015 | .............. F24C 14/00 |

(Continued)

OTHER PUBLICATIONS

Machine translation of JP 2001525763 A performed on May 15, 2023, Rafael (Year: 2001).*

(Continued)

*Primary Examiner* — Dana Ross
*Assistant Examiner* — Kevin Guanhua Wen
(74) *Attorney, Agent, or Firm* — HAYES SOLOWAY P.C.

(57) ABSTRACT

A cleaning chemical assembly has a collection container, a pump, two ports for storage containers that contain the same cleaning chemical, and a switchover valve that can be switched between a first state, in which the pump can pump liquid from the collection container to the storage container connected to the first one of the two ports while the second port is disconnected in a liquid-tight manner, and a second state, in which the pump can pump liquid from the collection container to the storage container connected to the second one of the two ports while the first port is disconnected in a liquid-tight manner. A sensor is provided that can be used to detect whether one of the storage containers is empty.

9 Claims, 4 Drawing Sheets

(51) Int. Cl.
*A47J 27/16* (2006.01)
*A47J 36/32* (2006.01)
*B08B 13/00* (2006.01)

(52) U.S. Cl.
CPC ......... *B08B 13/00* (2013.01); *A47J 2027/043* (2013.01)

(56) References Cited

U.S. PATENT DOCUMENTS

| | | | |
|---|---|---|---|
| 2003/0040984 A1 | 2/2003 | Inami | G06Q 10/087 |
| 2006/0255061 A1* | 11/2006 | Frieze et al. | B67D 5/08 222/64 |
| 2010/0313958 A1* | 12/2010 | Patel et al. | F16K 37/00 137/1 |
| 2011/0139199 A1 | 6/2011 | Pyo et al. | |
| 2012/0188076 A1* | 7/2012 | McSheffrey | G08B 1/08 340/539.17 |
| 2014/0220184 A1 | 8/2014 | Boggs | G07F 13/065 |
| 2017/0128905 A1* | 5/2017 | Pighin et al. | B01J 19/00 |
| 2018/0163972 A1 | 6/2018 | Budich | F24C 14/005 |
| 2019/0301073 A1 | 10/2019 | Kessler | A47L 15/449 |

FOREIGN PATENT DOCUMENTS

| | | | | |
|---|---|---|---|---|
| DE | 102015208634 | | 11/2016 | ............. F24C 14/00 |
| DE | 102015109019 A1 * | | 12/2016 | ............. F24C 14/005 |
| DE | 102017110303 | | 11/2018 | ............. F24C 14/00 |
| DE | 102017113372 | | 12/2018 | ............. F24C 14/00 |
| EP | 1793725 | | 4/2012 | ............. D06F 39/02 |
| EP | 2905069 A1 * | | 8/2015 | ............. B01F 1/0027 |
| ES | 3369476 A1 * | | 9/2018 | ............. B01F 21/22 |
| JP | 2001525763 A * | | 12/2001 | ............. B67D 7/0238 |
| JP | 2006516109 A * | | 6/2006 | ............. B67D 1/108 |
| WO | WO 2015056063 | | 4/2015 | ............. F24C 14/00 |

OTHER PUBLICATIONS

Machine translation of JP 2006516109 A performed on May 16, 2023, Carhuff et al. (Year: 2006).*

Machine translation of DE 102015109019 A1 performed on Oct. 26, 2023, Budich (Year: 2016).*

Machine translation of EP 3369476 A1 performed on Oct. 26, 2023, Droge et al. (Year: 2018).*

Machine translation of EP 2905069 A1 performed on Feb. 21, 2024, Topher (Year: 2015).*

Official Action issued in related U.S. Appl. No. 17/369,721, dated Nov. 7, 2023, 11 pages.

U.S. Appl. No. 17/369,721, filed Jul. 7, 2021, Kufner et al.

Offical Action issued in related U.S. Appl. No. 17/369,721, dated Mar. 7, 2024, 24 pages.

* cited by examiner

CLEANING CHEMICAL ASSEMBLY, CLEANING CHEMICAL MODULAR SYSTEM, AND COOKING APPLIANCE

The invention relates to a cleaning chemical assembly for a cooking appliance, a cleaning chemical modular system for a cooking appliance, and a cooking appliance with such a cleaning chemical modular system.

BACKGROUND OF THE INVENTION

The cooking appliance is in particular a so-called combination steamer, that is, a cooking appliance for professional application areas, for example in restaurants, company canteens and large-scale catering. The cooking appliance can be used to cook food in hot air, hot steam or a cooking chamber atmosphere with adjustable moisture content and adjustable temperature. In addition, a microwave generator may also be provided, which can be used to generate microwave radiation to assist the cooking process in the cooking appliance.

The cooking appliance involved may also be a so-called pan cooking appliance, which has one or more trough-like pans in which food can be cooked or liquids can be heated in order to then cook the food therein. To this end, each pan includes a heating device, which is typically disposed in the bottom and transfers the heat to the bottom by thermal conduction and thereby to the food or liquids that are in contact with the bottom.

In a cooking appliance, various kinds of soiling will accumulate in the course of operation of the cooking appliance, which may be caused, for example, by liquids as well as vapors originating from a cooking chamber of the cooking appliance. These may be, for example, condensate dripping from the walls of the cooking chamber and/or from food and food carriers located in the cooking chamber, vapors or deposits such as grease or other substances. Moreover, limescale deposits may develop as a result of the water used.

For this reason, it must be possible to reliably clean a cooking appliance at regular intervals. The challenge involved here is to be able to provide an appropriate cleaning solution at any time in order to optimally fit the cleaning process into further operating sequences of the cooking appliance.

Disclosed in the prior art are cooking appliances that provide a supply of cleaning chemical and/or cleaning solution sufficient for a multitude of cleaning operations. However, it may occur that the supply is depleted at a point in time when, due to the envisaged operation of the cooking appliance, it is not possible to replenish the appropriate cleaning chemical and/or cleaning solution or to replace the supply. This may result in necessary cleaning operations not being able to be performed without interrupting the operation of the cooking appliance.

The object of the invention is to provide a way that allows to ensure that a cooking appliance can be flexibly supplied with a cleaning solution.

BRIEF DESCRIPTION OF THE INVENTION

The object of the invention is achieved by a cleaning chemical assembly including a collection container, a pump, two ports for storage containers that contain the same cleaning chemical, and a switchover valve that can be switched between a first state, in which the pump can pump liquid from the collection container to the storage container connected to the first one of the two ports while the second port is disconnected in a liquid-tight manner, and a second state, in which the pump can pump liquid from the collection container to the storage container connected to the second one of the two ports while the first port is disconnected in a liquid-tight manner, wherein a sensor is provided that can be used to detect whether one of the storage containers is empty.

According to the invention, it is provided that in principle at least two storage containers with the same cleaning chemical are used in the cleaning chemical assembly. In this way, at the moment when one of the storage containers is empty, i.e. no longer contains any cleaning chemical, a second storage container is immediately available which still contains a supply of the appropriate cleaning chemical. In this case, a quick and reliable change of the particular storage container connected to the pump is possible by means of the switchover valve, which can specify the flow path from the pump to one of the storage containers. The sensor can be used to ensure that it is detected that one of the storage containers is empty, so that the switchover valve can be switched over.

In this way, the storage container does not have to be replaced by a user immediately as soon as it becomes empty, while it is ensured at the same time that a cleaning solution containing the cleaning chemical can be provided as required.

The cleaning chemical is provided in the storage container in particular in the form of a solid, for example as a block package. As a result of the pump conducting liquid from the collection container into the storage container, at least part of the solid cleaning chemical dissolves in the liquid supplied, so that the cleaning solution is produced. According to the invention, the cleaning solution is in particular an aqueous solution.

According to the invention, the flushed-out cleaning solution is in particular returned to the collection container and can again be pumped to the storage container by means of the pump in order to dissolve more of the cleaning chemical and in this way raise the concentration of the cleaning chemical in the cleaning solution. In this way, the cleaning chemical assembly can be designed to be compact and produce a cleaning solution having a desired concentration.

Basically, it is also possible to provide a plurality of cleaning chemicals, with which different cleaning solutions can be prepared. In this case, at least two ports for storage containers for each cleaning chemical are provided, so that for each of the cleaning chemicals it is ensured that a corresponding cleaning solution can be prepared at any time. Also, in this case, the switchover valve is adapted to switch between a first state and a second state for each of the cleaning chemicals, as previously described for the case of a single cleaning chemical. In addition, however, the ports for each of the further cleaning chemicals are each disconnected in a liquid-tight manner.

A sensor may be provided for each of the cleaning chemicals, which can be used to detect whether one of the storage containers per cleaning chemical is empty, or a common sensor may be employed which can detect simultaneously for all storage containers of all cleaning chemicals whether one of the storage containers is empty, and in particular which of the storage containers is empty.

The various cleaning solutions may also be chemically incompatible with each other. This is understood to mean that the cleaning solutions would react with each other in such a way that the respectively intended cleaning effect could no longer be achieved. For example, the cleaning solutions neutralize each other.

In particular, the storage container has a total weight of at most 1.5 kg, preferably at most 1 kg. In this way, it is made sure that the individual storage containers can be handled easily. At the same time, the storage container preferably contains a quantity of cleaning chemical that is sufficient for a large number of cleaning processes of the cooking appliance.

The sensor may be a temperature sensor, a flow sensor, an acoustic sensor, a conductivity sensor, an impedance sensor, a capacitive sensor, a pH sensor, a weight sensor, and/or a UV/VIS spectroscopy unit.

The type of sensor is preferably matched to the cleaning chemical employed, so that the respectively measured value gives a reliable indication of the dissolved amount of cleaning chemical in the cleaning solution.

In principle, the cleaning chemical may also have an additive mixed in, which allows a more reliable detection with the particular sensor used. For example, the additive is a dye.

The sensor may be associated with the respective storage container and/or the collection container.

For example, the sensor may be a capacitive sensor that is arranged such that the liquid directed by the pump into the storage container comes into contact with the capacitive sensor as soon as there is no longer any cleaning chemical in the storage container. In this way, an electric circuit can be closed, the current of which provides the sensor signal.

In a further variant, the sensor may be an acoustic sensor that is configured to detect noises in the storage container, for example, the sound made by the liquid directed into the storage container by the pump when it impinges on an inside of the storage container. The acoustic sensor may be arranged on the outside of the storage container so that the sensor does not need to come into direct contact with the liquid and/or the cleaning chemical.

A temperature sensor can infer that a storage container is empty, based on an absence of a temperature change that should occur when cleaning chemical dissolves in the liquid.

By means of a conductivity sensor (also referred to as a conductance sensor) or an impedance sensor, it can be concluded that a storage container is empty if the conductivity measured (or the conductance measured) or the impedance measured remains constant or changes only insignificantly.

Similarly, a pH sensor can be used to determine that the storage container is empty when the pH value no longer changes, changes only insignificantly, or has reached a predetermined value.

The weight sensor is configured in particular to determine the weight of the storage container so that on the basis of a known initial mass of the storage container and a known initial mass of cleaning chemical provided in the storage container, it can be determined that the entire amount of cleaning chemical has been consumed.

A flow sensor in particular is advantageous if the dissolution rate of the cleaning chemical in the liquid or cleaning solution is known. In this case, the volume of liquid or cleaning solution passing the sensor can be used to determine when the amount of cleaning chemical present in the storage container has been used up.

Preferably, the storage containers are non-destructively detachably fixed to the respective port of the cleaning chemical assembly, so that the storage containers can be replaced in a simple manner when the entire amount of cleaning chemical of the respective storage container has been used up. For example, the port includes a sealing ring with a sealing lip into which the storage container is inserted. Alternatively, the storage container may include a threaded connection by means of which the storage container is screwed to the port in a liquid-tight manner. Also, a bayonet connection may be employed for fastening the storage containers, as long as a liquid-tight closure is ensured.

The object of the invention is further achieved by a cleaning chemical modular system including a cleaning chemical assembly of the type described above, wherein a controller is provided which is connected to the switchover valve and the sensor.

Furthermore, according to the invention, it is not required for the controller to be installed in the cleaning chemical assembly itself, so that the controller can also be made use of for further functions in the cooking appliance.

The sensor is more particularly adapted to send a signal when one of the storage containers is empty. In this way, the controller can promptly receive information from the sensor that the respective storage container is empty and that a changeover should be made to the second storage container.

Preferably, the controller is adapted to switch the switchover valve from one state to the other when it is detected on the basis of the signal of the sensor that one of the storage containers is empty. In this way, it is not required that components for evaluating the sensor data be present in the cleaning chemical assembly itself, while reliable actuation of the switchover valve can be ensured.

In particular, the controller is also connected to the pump and can activate it. By having the controller control both the switchover valve and the pump, both the flow path and the flow rate of the liquid or cleaning solution within the cleaning chemical assembly can be centrally controlled by the controller.

The object of the invention is further achieved by a cooking appliance including a cleaning chemical modular system of the type described above.

The controller of the cleaning chemical modular system may at the same time control further functions of the cooking appliance. In this case, there is no need to provide additional controllers or computing units for further functions of the cooking appliance.

The cleaning chemical assembly may also be disposed outside the cooking appliance. In other words, the cleaning chemical assembly need not be present within a housing of the cooking appliance.

In particular, the cooking appliance includes a display on which a message appears when one of the storage containers is empty. In this way, a user of the cooking appliance is notified that one of the storage containers is due for replacement.

The cooking appliance according to the invention allows the user not to have to replace the storage container immediately, while the cooking appliance can still be cleaned if necessary. As a result, unplanned interruptions in the operation of the cooking appliance can be avoided.

BRIEF DESCRIPTION OF THE DRAWINGS

Further advantages and characteristics of the invention will be apparent from the following description of exemplary embodiments and from the drawings, in which.

DETAILED DESCRIPTION OF THE INVENTION

Figure 1:
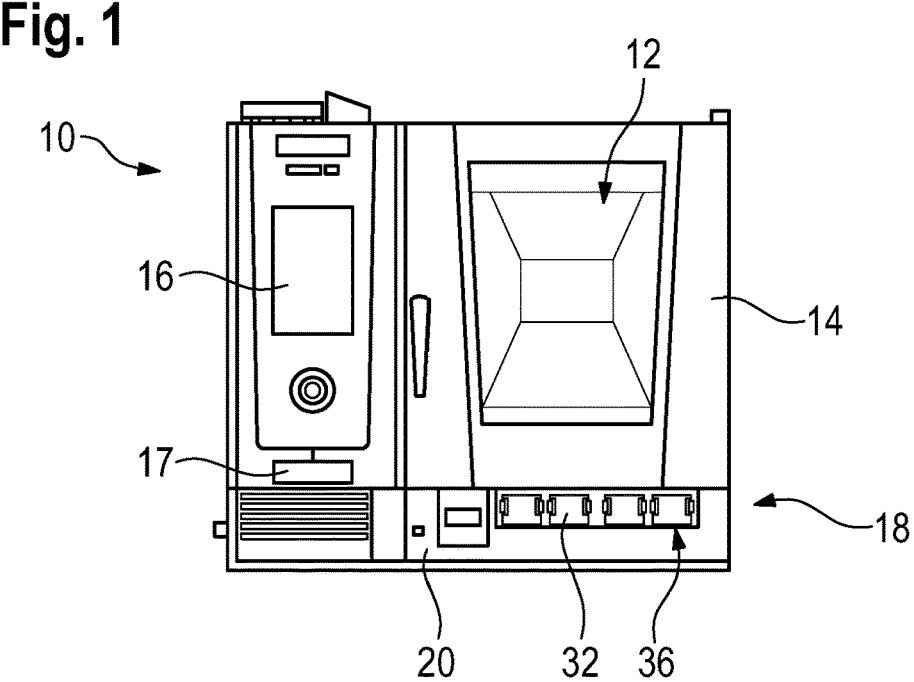
FIG. 1 shows a cooking appliance according to the invention.

FIG. 1 shows a cooking appliance 10 according to the invention. The cooking appliance 10 is a so-called table-top appliance, which is usually operated on a base (not shown). The base may be, for example, a table or another cooking appliance. Basically, however, the cooking appliance could also be a so-called floor-mounted appliance, which is positioned directly on the floor.

The cooking appliance 10 is a so-called combination steamer, in which food can be cooked in a cooking chamber using a cooking chamber atmosphere, which can be controlled in terms of temperature, moisture and circulation rate. More particularly, a cooking appliance for professional applications is involved, for example in restaurants, company canteens and large-scale catering.

In principle, the cleaning chemical modular system may also be used for other types of cooking appliances, for example for a pan cooking appliance.

A so-called inner case 12 of the cooking appliance 10 can be seen here, which surrounds the cooking chamber and is closed by a cooking chamber door 14.

The cooking appliance 10 features a user interface 16 which is in the form of a touch-sensitive display, i.e. a user of the cooking appliance 10 can control the latter using the user interface 16, and also, the same user interface 16 serves as a display for information on the status as well as for operation of the cooking appliance 10.

The user interface 16 is connected to a controller 17, drawn in schematically in FIG. 1, which controls the assemblies of the cooking appliance 10.

The cooking appliance 10 includes a cleaning chemical assembly 18 according to the invention, which in the embodiment shown is arranged below the inner case 12.

The controller 17 and the cleaning chemical assembly 18 together constitute a cleaning chemical modular system according to the invention.

Figure 2:
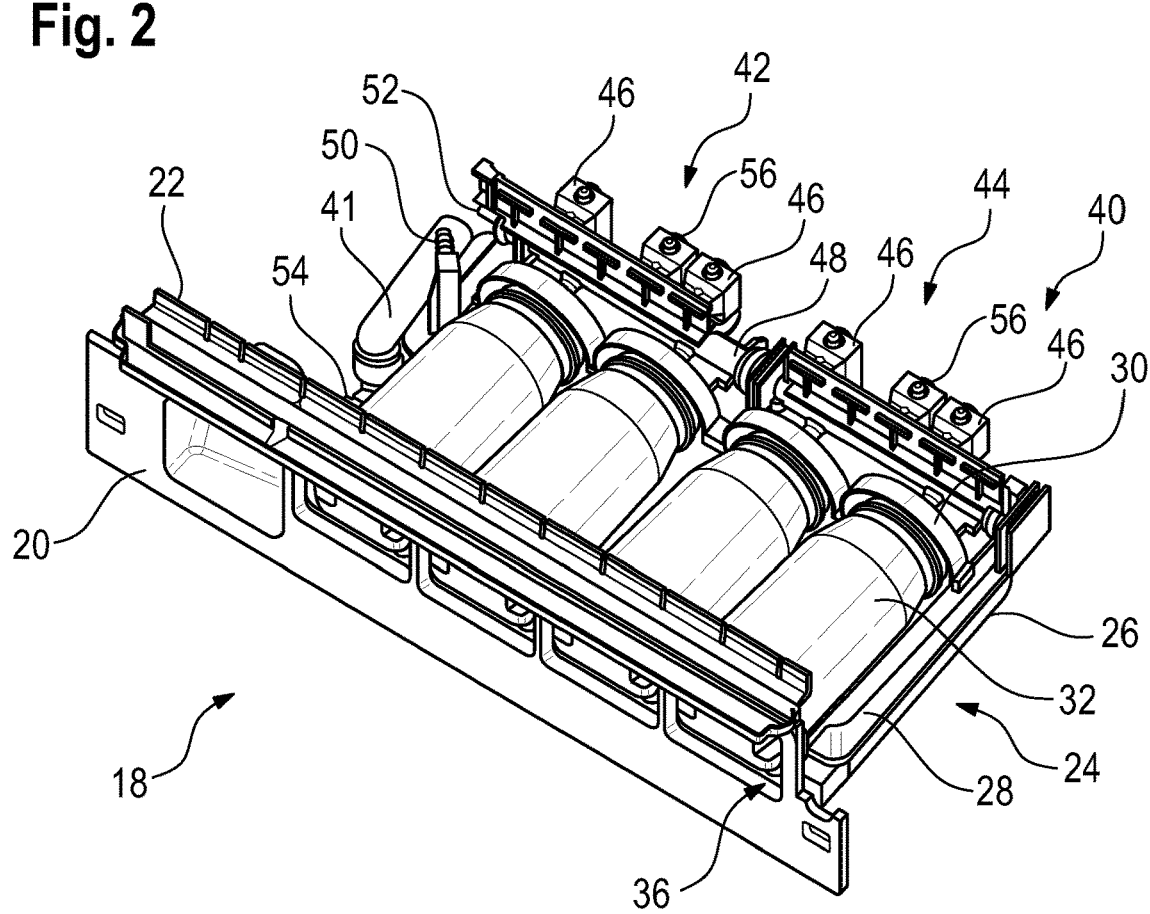
FIG. 2 shows a perspective illustration of a cleaning chemical assembly according to the invention of the cooking appliance of FIG. 1.

FIG. 2 shows a perspective illustration of the cleaning chemical assembly 18 of FIG. 1, only those components being illustrated that are necessary to understand the invention.

The cleaning chemical assembly 18 has a panel 20, which is attached to the cooking appliance 10 by means of a detent element 22, covering the cleaning chemical assembly 18 to the outside.

The cleaning chemical assembly 18 comprises a collection container 24 that is composed of a trough 26 and a cover 28 placed on the trough 26. The trough 26 and the cover 28 engage with each other such that the collection container 24 is sealed for liquids.

A plurality of ports 30 are formed in the cover 28; in the embodiment shown there are a total of four ports 30 arranged side by side at the same level.

Each port 30 has a storage container 32 associated therewith, which is non-destructively detachably connected to the respective port 30. In the embodiment shown, the storage containers 32 are each plugged into the respectively associated port 30 in a fluid-tight manner.

In the embodiment shown, the storage containers 32 are cartridges which can be inserted into and removed again from the cleaning chemical assembly 18 through cutouts 36 in the panel 20.

Figure 5:
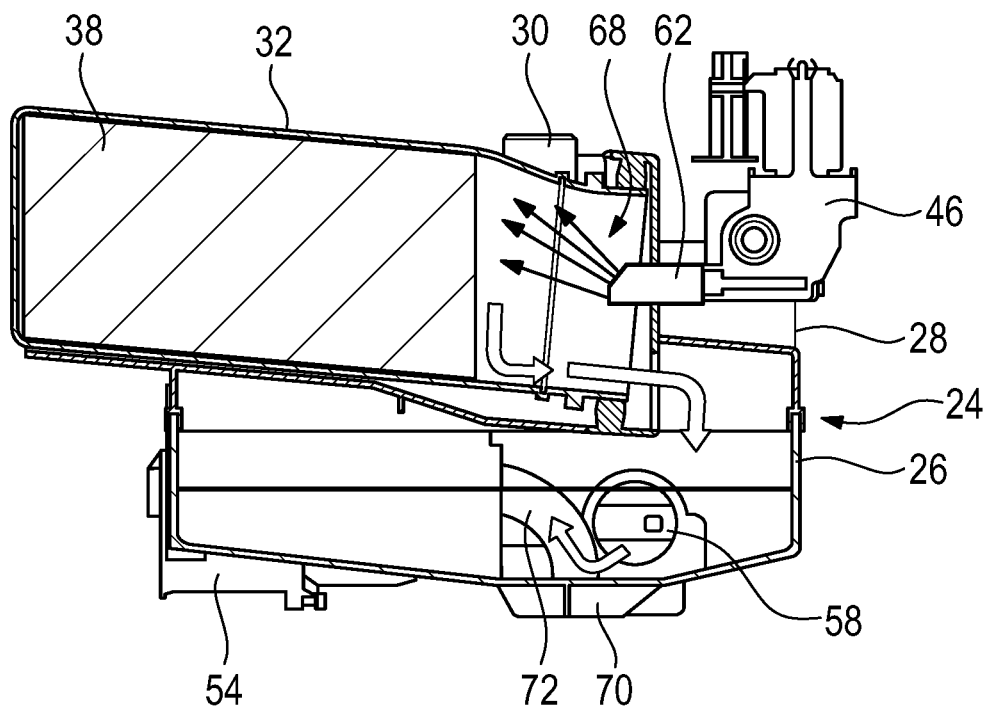
FIG. 5 shows a sectional view of the cleaning chemical assembly of FIG. 2.

The storage containers 32 each accommodate a cleaning chemical 38 therein (cf. FIG. 5).

The cleaning chemical assembly 18 further includes a switchover valve 40, which in the embodiment shown is configured as a valve block having two valve block subunits 42 and 44.

Each of the valve block subunits 42 and 44 has two of the ports 30 of the collection container 24 associated therewith, a valve 46 being provided for each associated port 30.

In other words, in the embodiment shown, the switchover valve 40 is not realized as a single valve, but comprises a plurality of valves 46.

The valves 46 are arranged along a flow pipe 48 of the valve block.

The storage containers 32 associated with the valve block subunit 42 hold a first cleaning chemical, and the storage containers 32 associated with the valve block subunit 44 hold a second cleaning chemical that is different from, and chemically incompatible with, the first cleaning chemical.

Basically, however, the valve block may also consist of one single valve block subunit or of more than two valve block subunits 42 or 44, which include(s) valves 46 associated with the respective ports 30. Also, more than two different cleaning chemicals may be employed.

According to the invention, however, it is provided that at least two storage containers 32 are present in the cleaning chemical assembly 18 for each cleaning chemical 38 employed. The different storage containers 32 of an individual cleaning chemical 38 may be arranged in different valve block subunits 42 or 44.

The cleaning chemical assembly 18 further features a water inlet 50 through which water can be supplied to the cleaning chemical assembly 18, in particular to the collection container 24.

FIG. 2 furthermore shows a connecting piece 41, via which a valve block inlet 52 of the valve block is connected to a pump 54.

Figure 3:
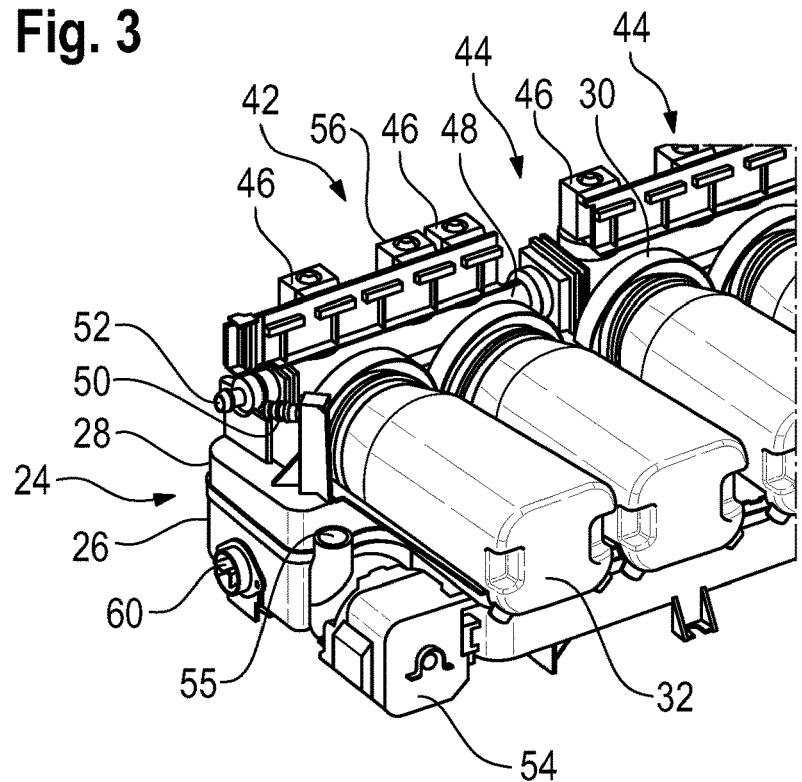
FIG. 3 shows a further perspective illustration of the cleaning chemical assembly of FIG. 2.

FIG. 3 shows a further perspective view of the cleaning chemical assembly 18, with the connecting piece 41 not depicted for a better view.

In FIG. 3, it can be seen more clearly that the pump 54 is connected to and in fluid communication with the trough 26. Liquid received in the collection container 24 can be directed by the single pump 54 to the valve block inlet 52, and thus to the storage containers 32, via a pump outlet 55.

Figure 4:
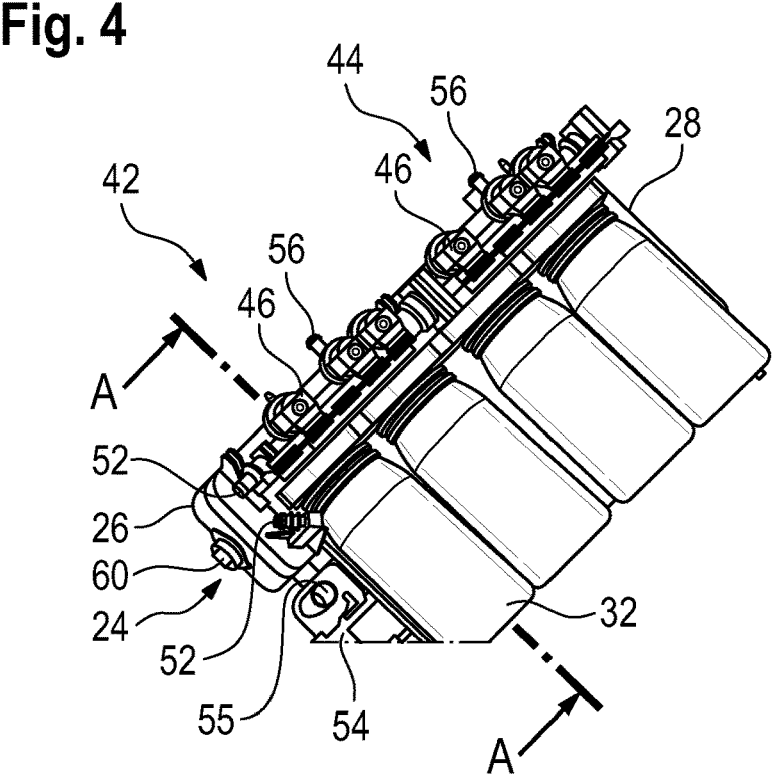
FIG. 4 shows a top view of the cleaning chemical assembly of FIG. 2.

FIG. 4 illustrates a top view of the cleaning chemical assembly 18, in which the structure of the valve block can be better seen.

In addition to the valves 46, each valve block subunit 42 or 44 includes an outlet port 56 that is connected to further piping systems (not shown) of the cooking appliance 10, for example to a cleaning agent box (not shown) or a steam generator (not shown) of the cooking appliance 10.

Furthermore, the collection container 24 includes a sensor 58 (cf. FIG. 5), which is connected to the controller 17 of the cooking appliance 10 by means of a sensor connection 60.

In particular, the sensor 58 is a temperature sensor, a flow sensor, a conductivity sensor, an impedance sensor, a pH sensor, or a refractive index sensor.

The sensor 58 may additionally serve as a filling level sensor, which detects the filling level within the collection container 24. In principle, however, a separate filling level sensor may also be arranged within the collection container 24. Alternatively or additionally, the volume of liquid in the collection container 24 may be known by means of a flow sensor (not shown), which is associated, for example, with the water inlet 50.

In FIG. 5, it can be seen that the valve 46 is in fluid communication with a nozzle 62 that protrudes at least partly into the storage container 32.

The cleaning chemical 38 inside the storage container 32 is a block package, that is, it is provided in the form of a solid inside the storage container 32.

The storage container 32 is arranged so as to be inclined inside the port 30, so that a slope towards the trough 26 is produced.

The trough 26 includes a sink 70 above which a suction pipe 72 is disposed so that liquid from the trough 26 can be returned to the pump 54.

The sensor 58 is arranged within the trough 26.

The mode of operation of the cleaning chemical assembly 18 will be discussed below.

When it is intended to clean the cooking appliance 10 using a washing liquor, the cleaning chemical assembly 18 can provide a cleaning solution, which can then be used to form the washing liquor.

To this end, first a predetermined volume of water is filled into the collection container 24 via the water inlet 50 (cf. FIGS. 2 to 4).

Subsequently, the pump 54 can conduct the water into the valve block via the pump outlet 55, the connecting piece 41 (cf. FIG. 2) and the valve block inlet 52.

The valves 46 of the valve block are controlled by the controller 17 such that the water pumped by the pump 54 is directed into one of the storage containers 32 in which the cleaning chemical 38 is arranged from which the cleaning solution is to be prepared.

The water is sprayed or injected through the nozzle 62 and into the appropriate storage container 32, as indicated by the group of arrows 68 in FIG. 5. In this way, a portion of the cleaning chemical 38 is detached so that an aqueous cleaning solution is formed which, owing to the slope of the storage container 32, flows into the trough 26 of the collection container 24.

As a result, the liquid present within the collection container 24 is now no longer just water, but a cleaning solution. The concentration of the aqueous cleaning solution generated in this manner can be determined by means of the sensor 58, if required.

The cleaning solution can be fed back to the pump 54 through the suction pipe 72. This allows the pump 54 to conduct the cleaning solution through the same flow path again, with a greater amount of cleaning chemical 38 being present in the cleaning solution with each cycle so that its concentration increases.

In other words, a first flush-out circuit is formed that leads from the collection container 24 through the pump 54 and the valve block into the storage container 32 and from there back to the collection container 24.

This process may be repeated for a predetermined period of time to produce a desired concentration of the cleaning solution, in particular if the dissolution rate of the cleaning chemical 38 is known. Alternatively, the sensor 58 may also be used to determine that the cleaning solution has a desired concentration.

As the cleaning chemical 38 is flushed out of the storage container 32, the latter empties until finally no more cleaning chemical 38 is left in the storage container 32. In this case, the sensor 58 detects that the storage container 32 is empty. In the embodiment shown, this is effected in that the value measured by the sensor 58 remains unchanged over a predetermined period of time or only changes by a minor tolerance value, for example by 1% of the measured value.

In this case, the sensor 58 sends a signal to the controller 17 via the sensor port 60, whereupon the controller 17 switches the switchover valve 40, i.e., the valve block, so that the liquid or cleaning solution pumped by the pump 54 is directed into the second one of the storage containers 32, which holds the same cleaning chemical 38, while the port 30 of the previously utilized storage container 32 is disconnected in a liquid-tight manner.

In this way, cleaning solution can continue to be generated without requiring a user of the cooking appliance 10 to immediately replace the storage container 32.

Additionally, a message is displayed on the display of the user interface 16 indicating that one of the storage containers 32 is empty and which one of the storage containers 32 is involved.

When the cleaning solution has a desired concentration, the same pump 54 can be used to establish an outlet fluid communication by which the cleaning solution produced is removed from the cleaning chemical assembly 18 via one of the outlet ports 56.

The cleaning solution produced can then form a washing liquor which is used to carry out a desired cleaning operation of the cooking appliance 10.

If required, water can then be supplied again through the water inlet 50 and the cleaning chemical assembly 18 can be flushed, with the same pump 54 being utilized for the flushing process. In this case, the flushing solution can be removed from the cleaning chemical assembly 18 via a drain port (not shown) of the valve block.

By analogy with the first flush-out circuit, the cleaning chemical assembly includes a second flush-out circuit; in this second flush-out circuit, it is not the first cleaning chemical 38 described above that is flushed out of the corresponding storage container, but the second cleaning chemical that is different therefrom. In this case, too, it can be reliably determined by means of the sensor 58 when a storage container of the second cleaning chemical is empty.

Accordingly, at least two different cleaning solutions can be generated by means of the cleaning chemical assembly 18 according to the invention, with a first cleaning solution preferably yielding a washing liquor with a pH value lower than 7 and a second cleaning solution yielding a washing liquor with a pH value greater than 7.

A washing liquor having a pH lower than 7 can be advantageously employed, in particular, to remove limescale deposits in the piping system and/or in a steam generator of the cooking appliance 10, whereas a washing liquor having a pH higher than 7 can be advantageously employed, in particular, to remove residues of cooked products from the piping system of the cooking appliance 10.

In principle, however, the cleaning chemical assembly according to the invention could also include only a single type of cleaning chemical 38.

Figure 6:
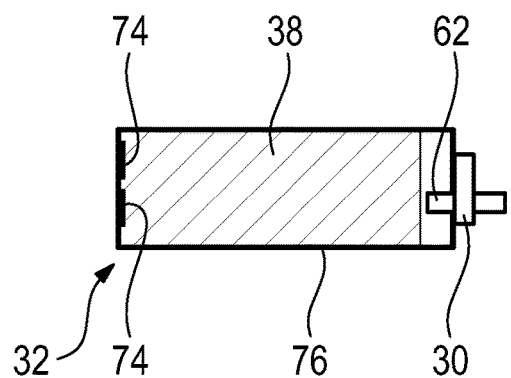
FIG. 6 shows a schematic representation of a filled storage container of a further embodiment of the cleaning chemical assembly according to the invention.

FIG. 6 schematically illustrates an alternative embodiment of the cleaning chemical assembly 18 that essentially corresponds to the embodiment previously described, so that only differences will be discussed.

In this embodiment, the cleaning chemical assembly includes two further sensors 74 mounted to an inner surface of an outer wall 76 of the storage container 32. The further sensors 74 are capacitive sensors.

The further sensors 74 and the nozzle 62 are connected by an electrical circuit, which, however, is broken as long as the cleaning chemical 38 is located in the storage container 32, since the cleaning chemical 38 and the outer wall 76 of the storage container 32 are electrically insulating.

Figure 7:
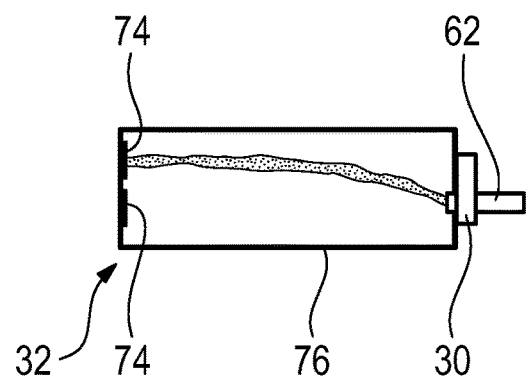
FIG. 7 shows a further schematic representation of the storage container from FIG. 6 when it has been emptied.

However, when the storage container 32 is empty, the liquid or cleaning solution sprayed or injected by the nozzle 62 can come into contact with at least one of the further sensors 74, as a result of which the electrical circuit closes and a current flows (cf. FIG. 7). In this case, the further sensor 74 sends a signal to the controller 17 indicating that the storage container 32 is empty.

Figure 8:
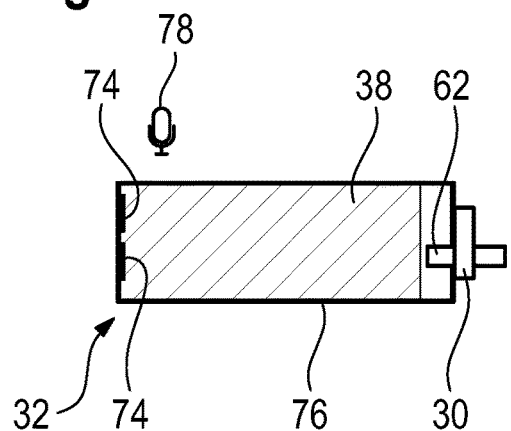
FIG. 8 shows a schematic representation of a filled storage container according to a further embodiment of the cleaning chemical assembly according to the invention.

FIG. 8 schematically illustrates yet another embodiment of the cleaning chemical assembly 18, which essentially corresponds to the embodiments described above, so that only differences will be discussed.

In this embodiment, an acoustic sensor 78 is also provided in addition to the further sensors 74 previously described. The acoustic sensor 78 is capable of picking up noises within the storage container 32.

Depending on the filling level of the cleaning chemical 38 within the storage container 32, the noise produced by the liquid or cleaning solution sprayed in or injected will change. In particular, a characteristic noise can be detected by means of the acoustic sensor when the storage container 32 is empty (cf. FIG. 9).

Figure 9:
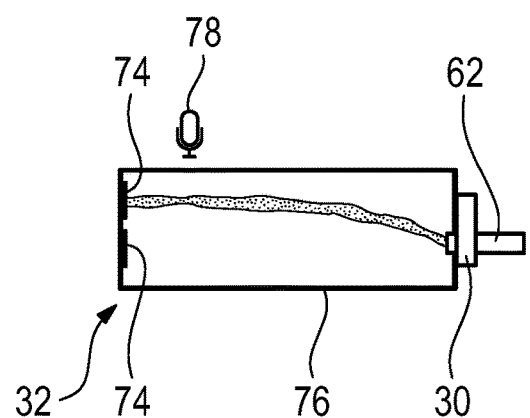
FIG. 9 shows a further schematic representation of the storage container from FIG. 8 when it has been emptied.

In the embodiment shown in FIGS. 8 and 9, the acoustic sensor 78 is combined with the further sensors 74. Basically, however, it is also possible to employ only the acoustic sensor 78 if the characteristic noise allows a reliable conclusion to be drawn that a storage container 32 is empty.

The further sensors 74 and the acoustic sensor 78 may be employed in addition to the sensor 58 arranged in the collection container 24, or may serve in its place as a sensor of the cleaning chemical assembly 18. The use of a multitude of sensors increases the reliability of detecting an empty storage container 32.

The invention claimed is:

1. A cleaning chemical assembly of a cooking appliance comprising a collection container, a pump, two ports for storage containers that contain the same cleaning chemical, and a switchover valve that can be switched between a first state, in which the pump can pump liquid from the collection container to the storage container connected to the first one of the two ports while the second port is disconnected in a liquid-tight manner, and a second state, in which the pump can pump liquid from the collection container to the storage container connected to the second one of the two ports while the first port is disconnected in a liquid-tight manner, wherein, for each of the storage containers, a sensor associated with the storage container is provided that can be used to detect whether the associated storage container is empty, wherein the sensor is a capacitive sensor that is arranged such that the liquid directed by the pump into the storage container comes into contact with the capacitive sensor as soon as there is no longer any cleaning chemical in the associated storage container, and wherein the cleaning chemical assembly is configured to switch from the first state to the second state when it is detected on the basis of the signal of the sensor that the first storage container is empty.

2. The cleaning chemical assembly of claim 1 wherein the storage containers are non-destructively detachably fixed to the cleaning chemical assembly.

3. A cleaning chemical modular system of a cooking appliance comprising a cleaning chemical assembly, the cleaning chemical assembly comprising a collection container, a pump, two ports for storage containers that contain the same cleaning chemical, and a switchover valve that can be switched between a first state, in which the pump can pump liquid from the collection container to the storage container connected to the first one of the two ports while the second port is disconnected in a liquid-tight manner such that a flush-out circuit is formed that leads from the collection container through the pump and the valve block into the storage container connected to the first one of the two ports and from there back to the collection container, and a second state, in which the pump can pump liquid from the collection container to the storage container connected to the second one of the two ports while the first port is disconnected in a liquid-tight manner such that a flush-out circuit is formed that leads from the collection container through the pump and the valve block into the storage container connected to the second one of the two ports and from there back to the collection container, wherein a sensor is provided that can be used to detect whether one of the storage containers is empty, the cleaning chemical modular system comprising a controller which is connected to the switchover valve and the sensor, and wherein the cleaning chemical modular system is configured to switch from the first state to the second state when it is detected on the basis of the signal of the sensor that the first storage container is empty.

4. The cleaning chemical modular system of claim 3 wherein the sensor is adapted to send a signal when one of the storage containers is empty.

5. The cleaning chemical modular system of claim 3 wherein the controller is adapted to switch the switchover valve from one state to the other when it is detected on the basis of the signal of the sensor that one of the storage containers is empty.

6. A cooking appliance comprising a cleaning chemical modular system as defined in claim 3.

7. The cooking appliance of claim 6 wherein the cooking appliance includes a display on which a message appears when one of the storage containers is empty.

8. A cleaning chemical assembly of a cooking appliance comprising a collection container, a pump, two ports for storage containers that contain the same cleaning chemical, and a switchover valve that can be switched between a first state, in which the pump can pump liquid from the collection container to the storage container connected to the first one of the two ports while the second port is disconnected in a liquid-tight manner, and a second state, in which the pump can pump liquid from the collection container to the storage container connected to the second one of the two ports while the first port is disconnected in a liquid-tight manner, wherein, for each of the storage containers, a sensor associated with the storage container is provided that can be used to detect whether the associated storage container is empty, wherein the sensor is an acoustic sensor that is configured to detect noises in the storage container such that a characteristic noise can be detected by means of the acoustic sensor when the associated storage container is empty, and wherein the cleaning chemical assembly is configured to switch from the first state to the second state when it is detected on the basis of the signal of the sensor that the first storage container is empty.

9. The cleaning chemical modular system of claim 3 wherein the sensor is one of a temperature sensor, a flow sensor, an acoustic sensor, a conductivity sensor, an impedance sensor, a capacitive sensor, a pH sensor, and a weight sensor.

\* \* \* \* \*